United States Patent
Rijn et al.

(10) Patent No.: US 6,189,161 B1
(45) Date of Patent: Feb. 20, 2001

(54) TOILET FOR RECREATIONAL VEHICLE WITH VENT FOR THE HOLDING TANK

(75) Inventors: Gerard Cornelis Rijn, Etten-Leur; Frank Schagen, C. B. Breda, both of (NL)

(73) Assignee: Thetford Corporation, Inc., Ann Arbor, MI (US)

(*) Notice: Under 35 U.S.C. 154(b), the term of this patent shall be extended for 0 days.

(21) Appl. No.: 09/488,106

(22) Filed: Jan. 20, 2000

(51) Int. Cl.[7] .................................................. E03D 1/00
(52) U.S. Cl. ........................................... 4/321; 4/323
(58) Field of Search ............................ 4/321–323, 329

(56) References Cited

U.S. PATENT DOCUMENTS

| 2,631,298 | 3/1953 | Nofsinger | 4/213 |
|---|---|---|---|
| 2,727,249 | 12/1955 | Kochert | 4/213 |
| 4,042,981 | 8/1977 | Cook | 9/4 |
| 4,145,773 | * 3/1979 | Sargent et al. | 4/321 |
| 4,319,366 | * 3/1982 | Baker, Jr. et al. | 4/321 |
| 4,324,007 | * 4/1982 | Morris | 4/321 |
| 4,439,875 | 4/1984 | Stewart et al. | 5/12 |
| 4,519,103 | 5/1985 | De Graw et al. | 5/19 |
| 4,764,994 | 8/1988 | Stewart | 1/0 |
| 4,805,660 | * 2/1989 | Antos et al. | 4/321 |
| 4,908,885 | * 3/1990 | Antos | 4/321 |
| 4,922,557 | * 5/1990 | Harding et al. | 4/321 |
| 5,031,249 | * 7/1991 | Sargent | 4/321 |
| 5,363,510 | * 11/1994 | Chlebek | 4/321 |
| 5,575,019 | 11/1996 | Dijewski | 9/4 |

* cited by examiner

*Primary Examiner*—Charles R. Eloshway
(74) *Attorney, Agent, or Firm*—Harness, Dickey & Pierce P.L.C.

(57) ABSTRACT

A valve and vent assembly for a self-contained sanitary system of the type including a toilet structure with a downwardly directed outlet opening and a storage compartment defined and located below the outlet opening, and a waste holding tank removably disposed within the storage compartment. The tank has a fill opening positioned in registry with the outlet opening when the tank is inserted within the storage compartment. The valve and vent assembly is operable to close the fill opening and to seal the tank to prevent leakage of waste from the tank through the fill opening, a vent passage in the storage compartment and communicating with the waste holding tank extends outside of said compartment thereby enabling noxious and odorous air in the holding tank to pass out of the tank.

5 Claims, 6 Drawing Sheets

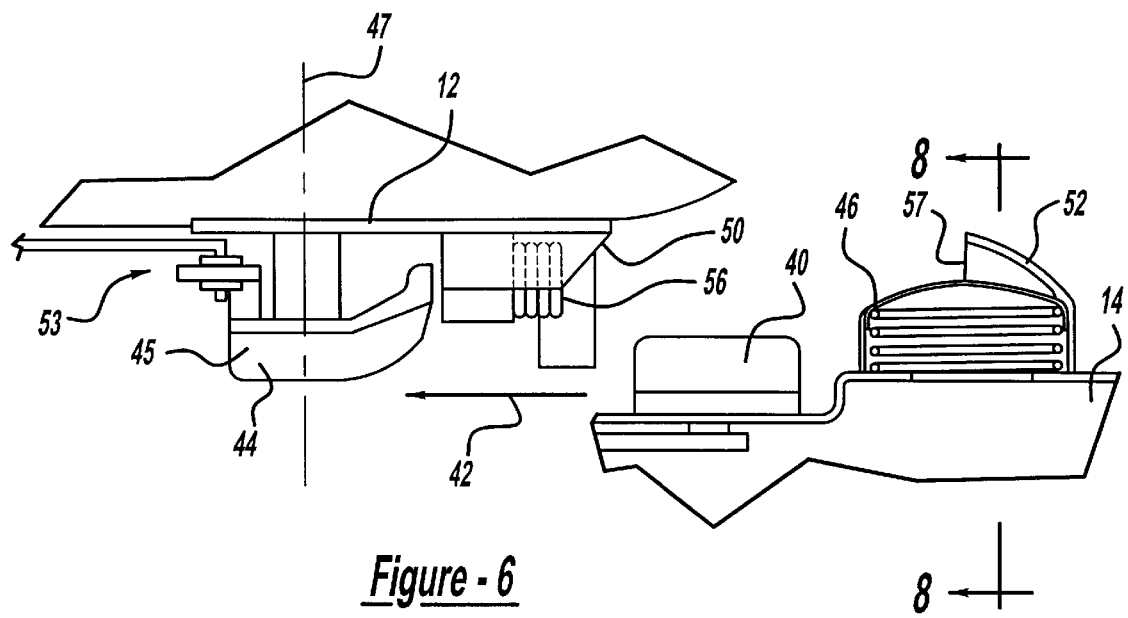
*Figure - 6*
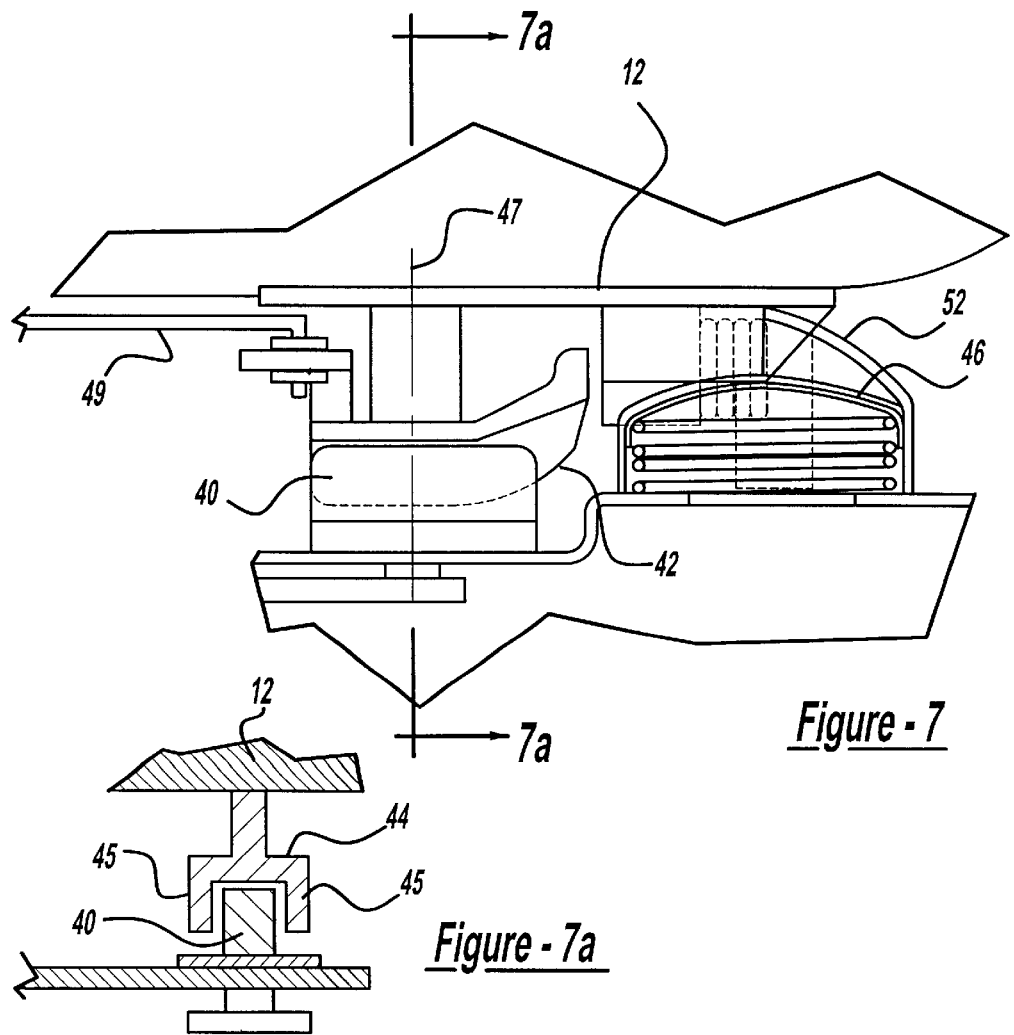
*Figure - 7*
*Figure - 7a*

TOILET FOR RECREATIONAL VEHICLE WITH VENT FOR THE HOLDING TANK

BACKGROUND AND SUMMARY OF THE INVENTION

This invention relates generally to toilets for use in recreational vehicles such as motor homes and travel trailers and, more particularly, this invention provides such toilets with venting of the toilet to avoid the escape of noxious odors from the toilet into the vehicle.

Removable waste holding tanks adapted for use with toilets are typically positioned within an interior compartment of the RV. Waste is transported by the toilet structure to the holding tank where it is stored. The holding tank can be conveniently removed from the RV through an exterior access door and then transported to a waste disposal sight for emptying.

To enable the holding tank to accept waste products from the toilet of the sanitary system, a waste holding tank of the above mentioned type generally includes a centrally disposed fill opening located within its top wall. A seal element surrounds the fill opening of the tank and includes an upper portion which seals against an outlet opening of the toilet bowl. So constructed, waste can be easily and sanitarily transferred into the holding tank.

U.S. Pat. Nos. 4,776,631, 4,892,349, 5,031,249 and 5,318,275, all owned by the assignee of this application, show examples of the self-contained toilet systems of the type including a waste receptacle having a downwardly directed outlet opening and a storage compartment defined and located below the outlet opening along with a waste holding tank removably disposed within the storage compartment. These systems enable the RV operator to remove the holding tank from the RV through a small door in a wall of the RV.

Waste disposal systems utilizing a removable holding tank have been in extensive use for more than ten years. However, at all times, there has been the threat that noxious odors from the holding tank will find their way to the living area of the recreational vehicle.

The principal object of this invention is to provide an automatic vent system for a mobile toilet. In answer to this need, the holding tank will be vented to the outside of the recreational vehicle. The human waste in the closed waste holding tank generates gas that ensures that the pressure inside the waste holding tank is greater than the air outside the holding tank.

When the waste holding tank, after emptying, is returned to the storage compartment, the vent passage will be opened and will communicate with the atmosphere outside the recreational vehicle. A flexible tube can connect with the vent system so as to lead the odor from the waste holding tank to the outside of the RV. The tubing can end outside the recreational vehicle either through the bottom, a sidewall, or the roof. It is also possible in this system to utilize a motorized fan to assist the flow of noxious air from the interior of the holding tank to the air outside the recreational vehicle.

Additional benefits and advantages of the present invention will become apparent to those skilled in the art to which this invention relates from the subsequent description of the preferred embodiment and the appended claims, taken in conjunction with the accompanying drawings.

BRIEF DESCRIPTION OF THE DRAWINGS

FIG. 6 is a fragmentary side view showing the mechanism for opening and closing the inlet opening in the holding tank and opening the valve in the vent passage; in the position of the waste holding tank moving in the direction of the arrow;

FIG. 7 is a fragmentary enlarged view of the elements shown in FIG. 6 with the waste holding tank in registry with the toilet outlet;

FIG. 7a is a fragmentary view of the elements shown in FIG. 5, 6 and 7 as seen from the line 7a—7a in FIG. 7;

DETAILED DESCRIPTION OF THE PREFERRED EMBODIMENT

Figure 1:
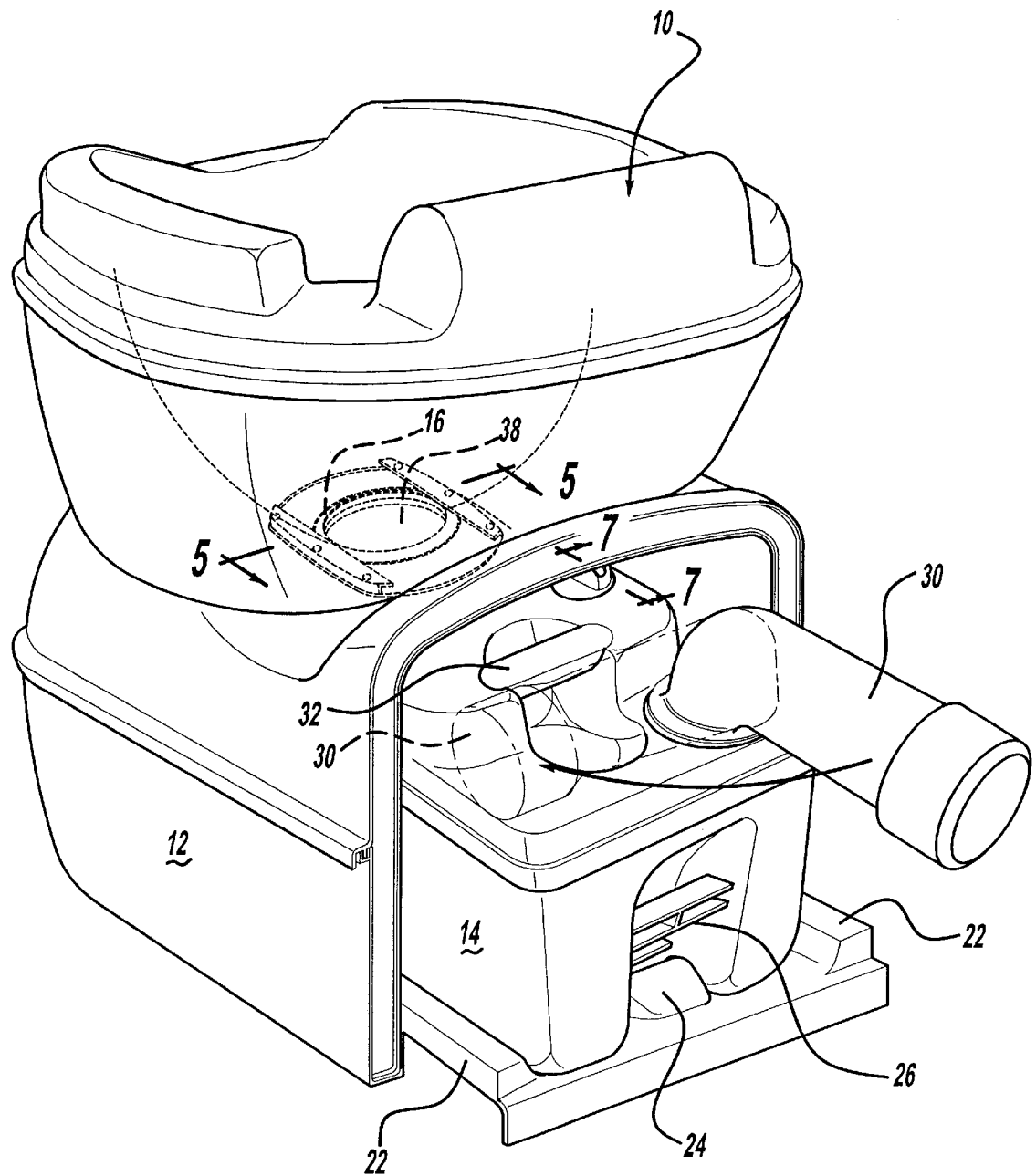
FIG. 1 is a perspective view of the toilet of this invention, showing the waste holding tank in a position in registry with the toilet outlet, with a portion of the storage compartment removed to show more of the holding tank and with the pour spout in a passive position in broken lines.
Figure 5:
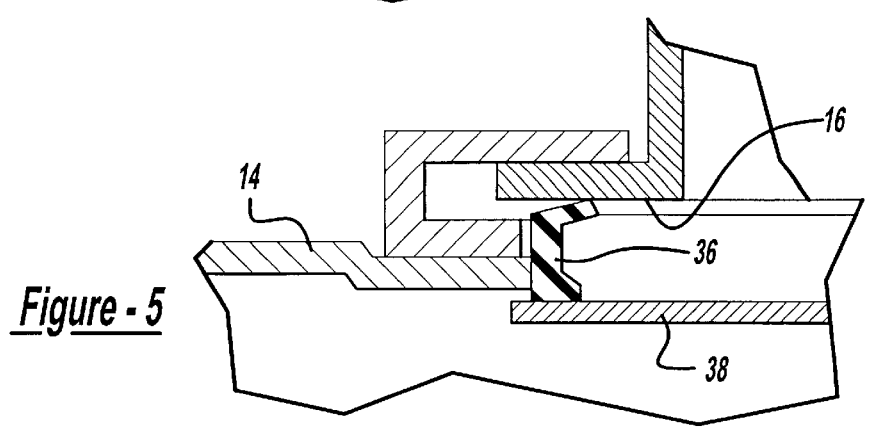
FIG. 5 is an enlarged fragmentary sectional view like FIG. 4 but with the inlet in the waste holding tank in registry with the toilet outlet, as seen from the line 5—5 in FIG. 1.

With reference to the drawing, the toilet of this invention, indicated generally at 10 in FIG. 1, is shown in FIG. 1 supported on a storage compartment 12 in which a waste holding tank 14 is removably disposed within the storage compartment 12. The toilet 10 has a downwardly located outlet opening 16 (FIGS. 1 and 5). The waste holding tank 14 has a inlet opening 18 positioned in registry with the outlet opening 16 when the waste holding tank 14 is inserted within the storage compartment 12 as shown in FIG. 1. The valve and vent assembly of this invention is operable to close the fill opening 18 and to seal the tank 14 and continuously vent the tank to atmosphere thereby preventing the leakage of waste from the tank through the fill opening.

Figure 2:
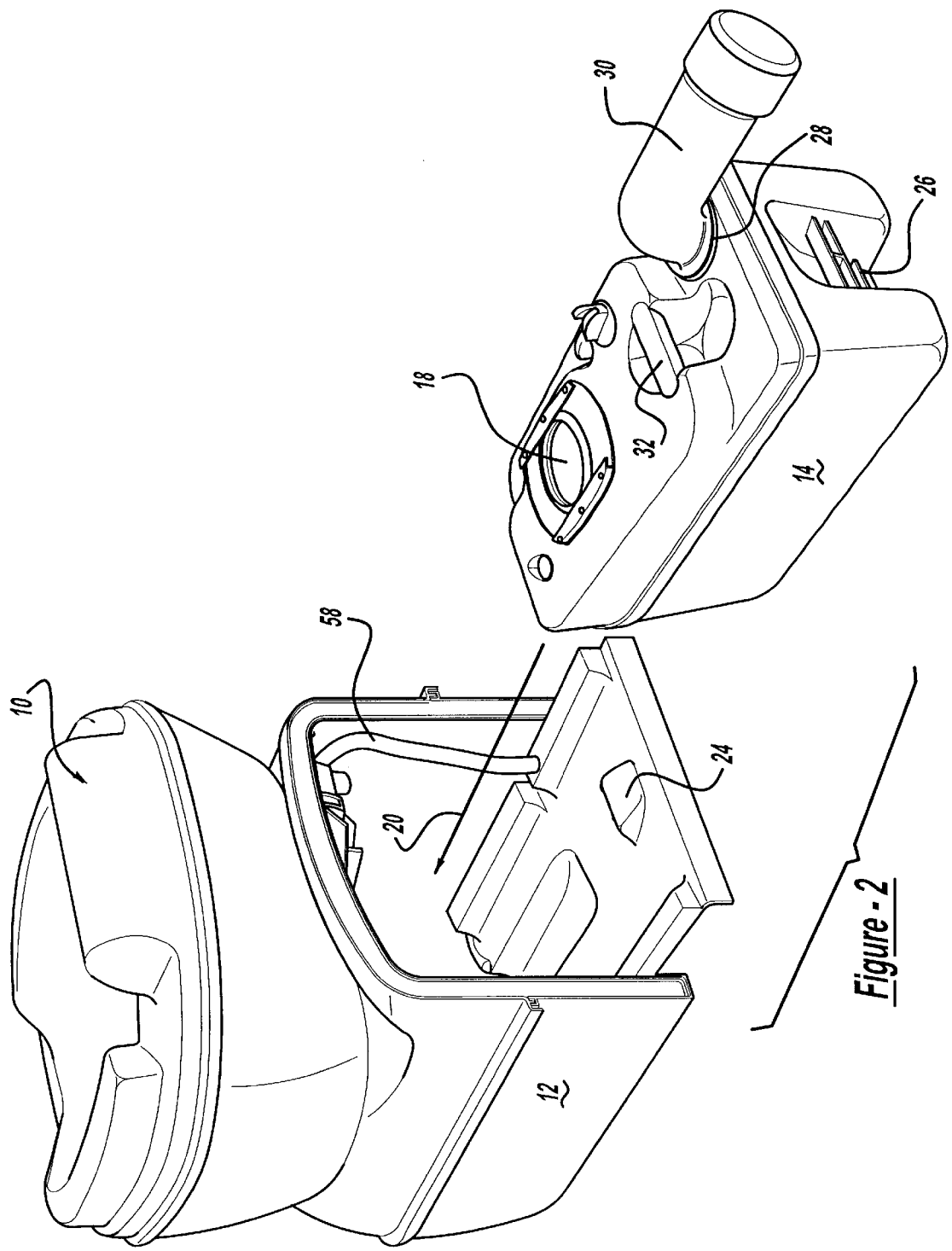
FIG. 2 is a perspective view showing the waste holding tank disengaged from the toilet.

The holding tank 14 is illustrated in FIG. 1 in position to accept waste from the toilet 10. In FIG. 2, the holding tank 14 has been removed from the storage compartment 12 for the dumping at a suitable site. In order to return the tank 14 to its position of registry with the toilet 10, the holding tank is moved longitudinally along the path shown by the arrow 20 in FIG. 2. The rails 22 are provided in the compartment 12 to maintain the holding tank 14 in a secured position in the compartment 12. A latch plate 24 in the compartment 12 cooperates with a lock plate 26 which cooperates with the rails 22 to maintain the holding tank 14 in its desired position in the compartment 23.

Figure 3:
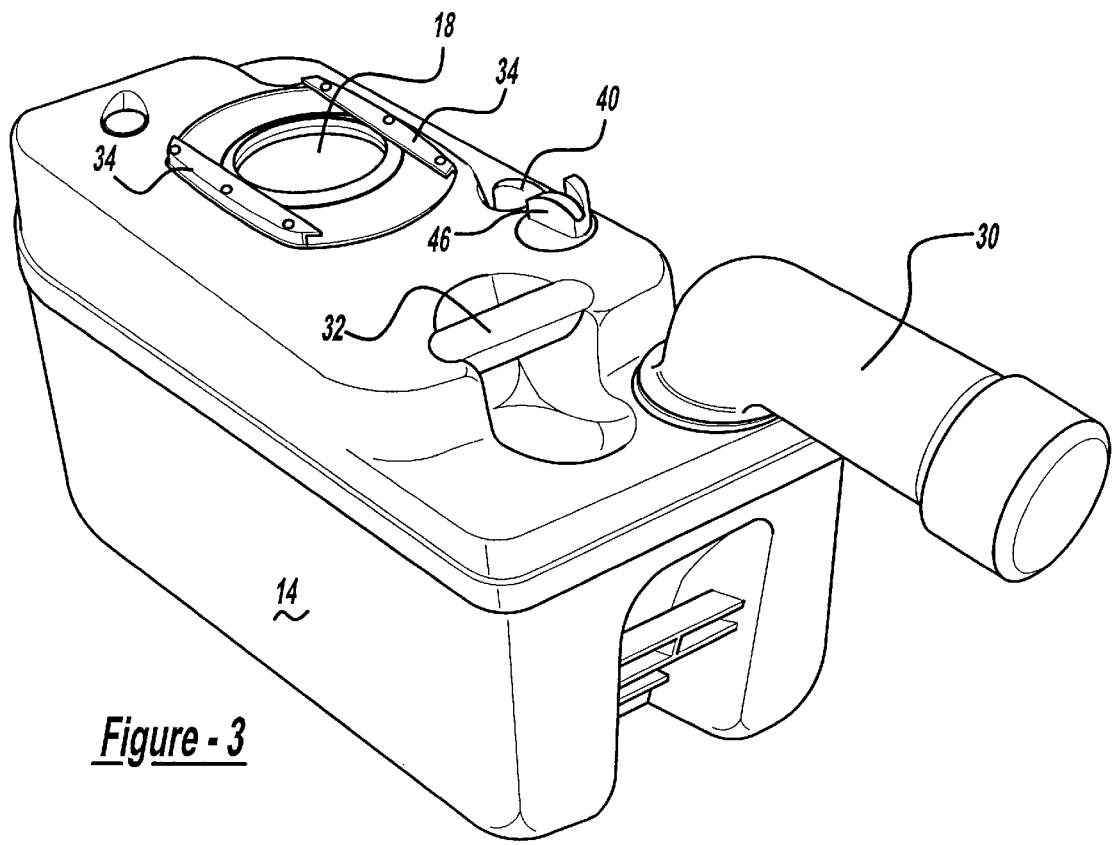
FIG. 3 is a perspective view of the waste holding tank with the discharge spout in a pouring position.

Referring to FIG. 3, on one end of the waste holding tank 14, is an opening 28 in which is mounted a drain spout 30. Drain spout 30 is in a position in FIG. 3 to facilitate emptying of the tank 14. During such procedure, a handle 32 enhances the convenience of the use of the tank 14. Channels 34 are provided on opposite sides of the inlet opening 18 into the interior of the tank 14.

Figure 4:
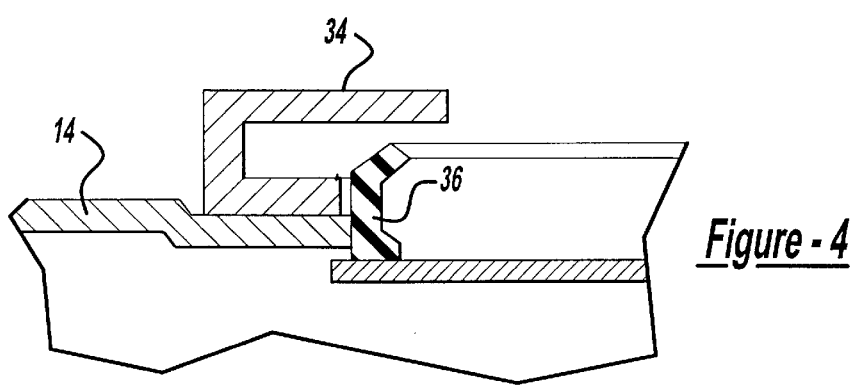
FIG. 4 is an enlarged fragmentary sectional view showing the relative positions of the waste holding tank and the toilet prior to the holding tank having been positioned in registry with the toilet, as seen from the line 4—4 in FIG. 1.

As shown in FIGS. 4 and 5 an annular seal 36 is mounted on the top of the tank 14. The seal cooperates with the opening 16 at the bottom of the toilet 10 and the valve blade 38 which ensures no leakage from the holding tank 14 at the inlet opening 18.

In FIG. 6, and FIG. 7, the movement of the tank 14 into the storage compartment 12 is illustrated. In FIG. 7 the fill opening 18 in the tank 14 is in registry with the downwardly directed outlet opening 16 in the toilet 10. A rotatable handle 40 on the top side of the tank 14 is operable to move the valve blade 38 back and forth (FIG. 5) between open and closed positions. In FIG. 6, it is shown that when the tank 14 is moved in the direction of the arrow 42 into engagement with a fork shaped actuator 44. The actuator 44 has two downwardly extending and horizontally spaced tines 45. The tines 45 are on opposite sides of the plate shape handle 40 as shown in FIG. 7a. In this case, the actuator 44 can rotate the upright handle 40 about the axis 47 to open the blade 38. The user of the toilet 10 can then manipulate the usual switch (not shown) which moves the members 53 which turn the actuator 44 to move the handle 40.

Figure 8:
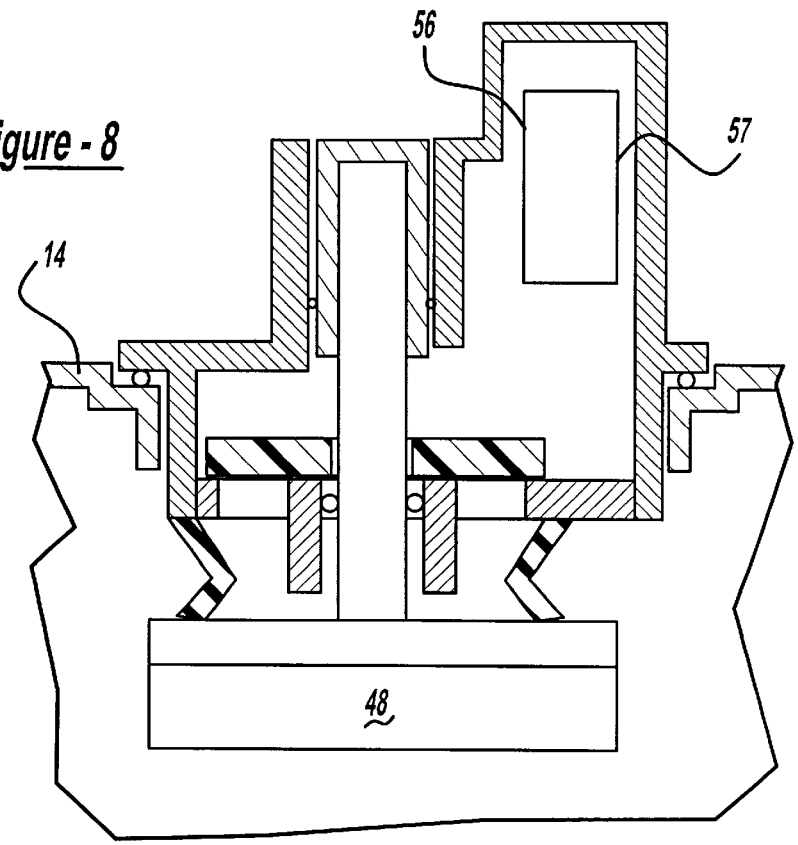
FIG. 8 is a fragmentary view of the vent valve as seen from the line 8—8 in FIG. 6 with the vent valve in a closed position.
Figure 9:
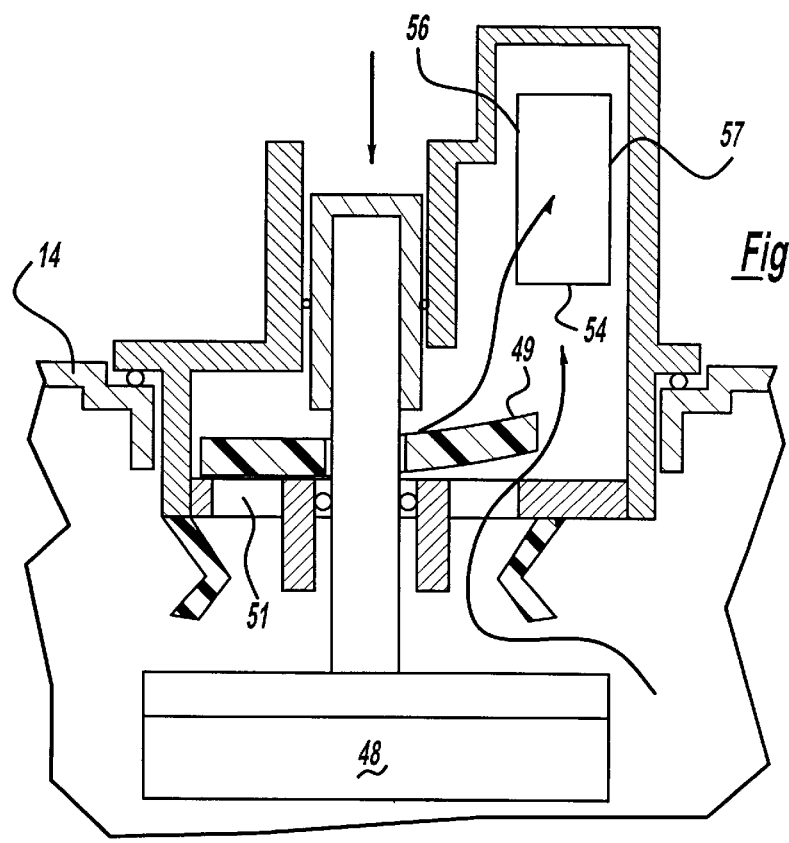
FIG. 9 is a sectional view like FIG. 8 with the vent valve in the open position.

Also on the top side of the tank 14 is a spring biased actuator 46 for moving the vent valve 48 from its closed position shown in FIG. 8 to its open position shown in FIG. 9. A light weight check valve member 49 is mounted in the holding tank 14 to prevent flow of air in a direction opposite to the arrows in FIG. 9 and subsequently into the toilet 10. As shown in FIG. 8, the member 49 covers the air inlet passage 51 to prevent flow of air through the tank 14 to the toilet 10. When the valve 48 is open (FIG. 9) noxious gas from the tank 14 pushes the member 49 up to allow gas to reach the exit ports 56 and 57.

As shown in FIG. 6, an actuator 50 in compartment 12 engages the upper concave surface of the actuator 46 and depresses the valve 48 from its closed position shown in FIG. 8 to its open position shown in FIG. 9.

To one side of the actuator 50 is a rectangular port 56 in the vent passage 54 as shown in FIG. 9. In the position of the tank 14 in FIG. 6, the port 56 is open to the atmosphere. To one side of the actuator 50 is a section 52 of the vent passage 54 with a rectangular port 57 which is horizontally aligned with the port 56. When the tank 14 is in registry with the toilet 10, the port 57 is in abutment with the port 56 and the passage 54 connects the interior of the tank 14 with the atmosphere.

Figure 10:
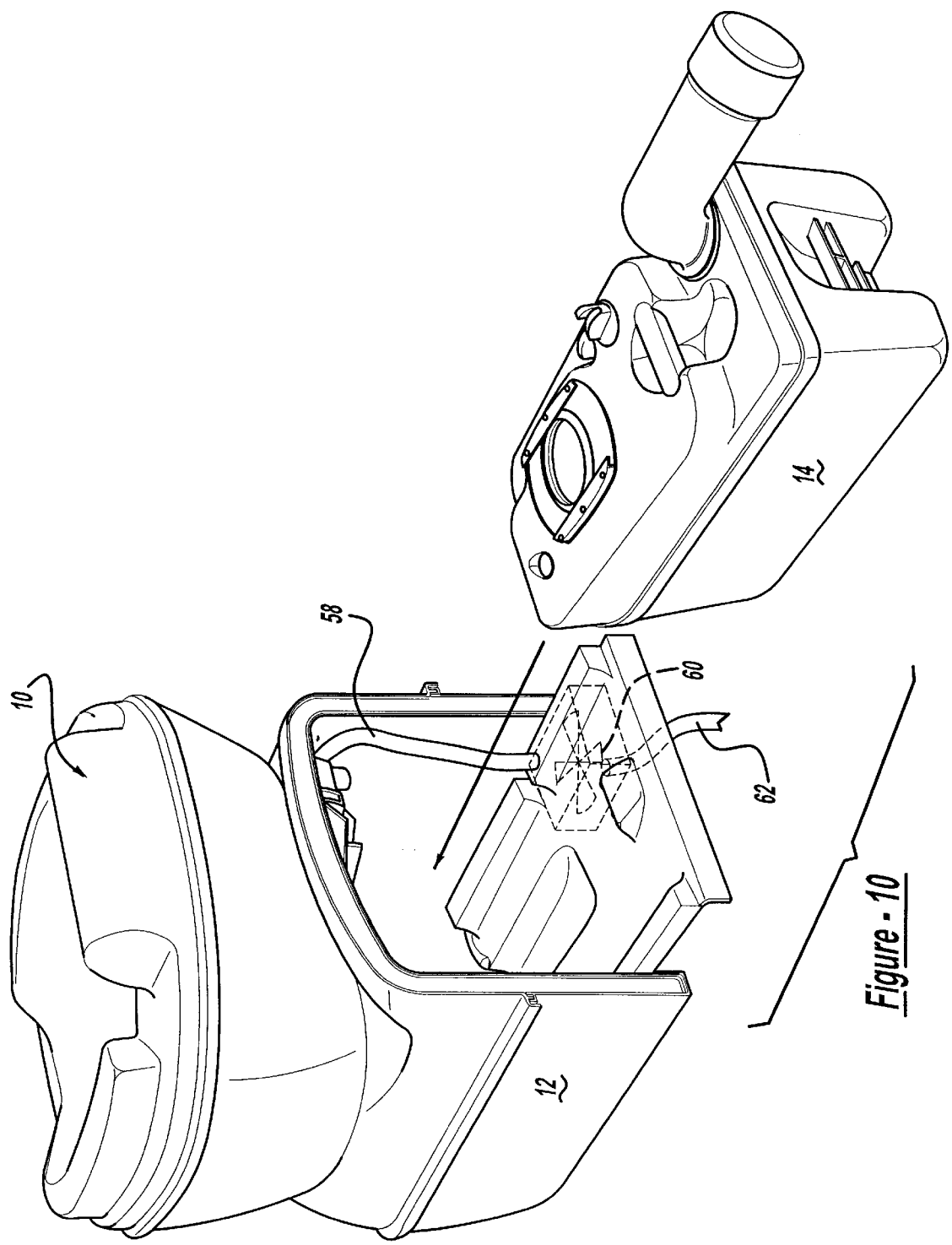
FIG. 10 is a perspective view like FIG. 2 showing another embodiment of the invention in which a motorized fan is placed in the vent passage so as to pull the noxious air out of the holding tank.

From the above description, it is apparent that the valve and vent assembly of this invention provides for the continuous venting of the holding tank 14 so that noxious and odorous smells can not escape inside the RV in which the toilet 10 is located. The final travel of the atmosphere of the holding tank 14 is through a flexible tube 58 in the storage compartment 12. In FIG. 10 another embodiment of the invention is shown which is entirely the same as the invention disclosed in FIGS. 1 to 9 except for the addition of a motorized fan 60 which continuously draws air from the interior of holding tank 14 and dispels it through an extension 62 of the flexible passage 58.

We claim:

1. A vent assembly for a self-contained sanitary system of the type including a toilet with a downwardly directed outlet opening and a storage compartment defined and located below said outlet opening, a waste holding tank removably disposed within said storage compartment, said tank having a fill opening positioned in registry with said outlet opening when said tank is inserted horizontally into said storage compartment, a valve assembly being operable to close said fill opening in said holding tank thereby preventing the leakage of waste from said tank through said fill opening, during removal of said tank from said compartment, said vent assembly comprising:

a vent passage adapted for placement in said storage compartment and for communicating with said waste holding tank, said vent passage, in use, extending outside of said compartment thereby enabling noxious and odorous air in said holding tank to pass out of said tank, a valve adapted for connection with said holding tank and operable to close said passage when the holding tank is removed from said compartment, and means operable in response to return of the holding tank to open said valve when the holding tank fill opening is in alignment with said outlet opening.

2. The assembly according to claim 1 wherein movement of said holding tank to said position in registry with said toilet outlet opening is effective to provide an unobstructed path in said vent passage from said holding tank to the atmosphere outside said storage compartment.

3. The assembly according to claim 1 further including a motorized fan in said vent passage.

4. In an RV, a toilet with a downwardly directed outlet opening and a storage compartment defined and located below said outlet opening, a waste holding tank removably disposed within said storage compartment, said tank having a fill opening positioned in registry with said outlet opening when said tank is inserted within said storage compartment, means on said toilet being operable to close said fill opening and to seal said tank thereby preventing the leakage of waste from said tank through said fill opening;

a vent passage in said storage compartment and communicating with said waste holding tank, said vent passage extending outside of said compartment thereby enabling noxious and odorous air in said holding tank to pass out of said tank, a valve associated with said holding tank and operable to close said passage when the holding tank is being removed from said compartment, and means operable in response to replacement of the holding tank in said storage compartment to open said fill opening and to position the holding tank fill opening in alignment with said outlet opening.

5. The toilet according to claim 4 further including a motorized fan in said vent passage.

* * * * *